Sept. 9, 1969  R. D. PITTS ET AL  3,466,539
FOUR-POINT PROBE FOR MICROMINIATURIZED CIRCUITRY HAVING
INDIVIDUAL BIASING MEANS FOR EACH POINT
Filed Oct. 31, 1966  2 Sheets-Sheet 1

INVENTORS
ROBERT DONALD PITTS
DONALD R. ZRUDSKY
BY *Moody & Hallacher*

ATTORNEYS

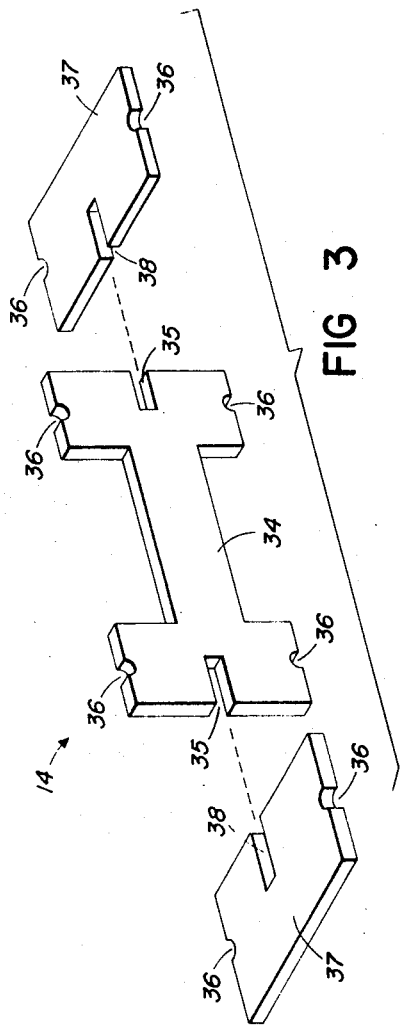
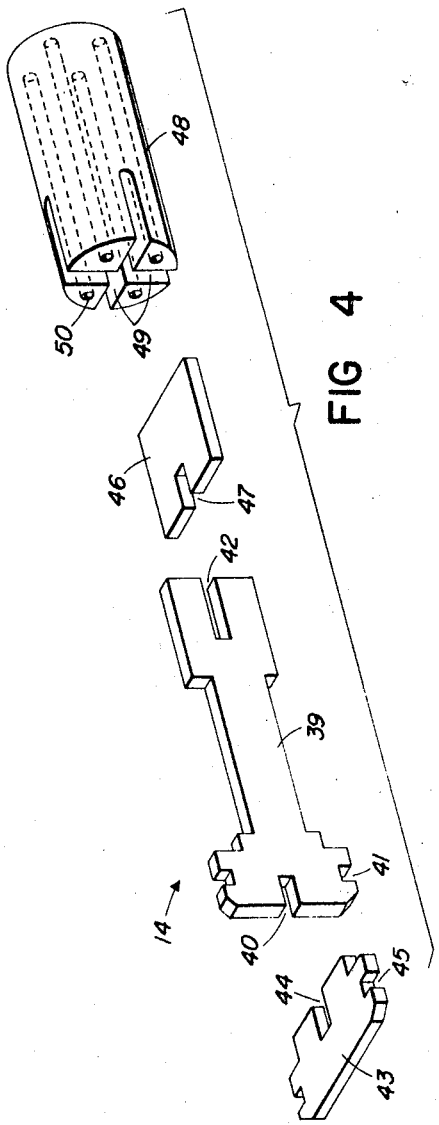
INVENTORS
ROBERT DONALD PITTS
DONALD R. ZRUDSKY
ATTORNEYS 3,466,539
FOUR-POINT PROBE FOR MICROMINIATURIZED CIRCUITRY HAVING INDIVIDUAL BIASING MEANS FOR EACH POINT
Robert Donald Pitts, Cedar Rapids, and Donald R. Zrudsky, Solon, Iowa, assignors to Collins Radio Company, Cedar Rapids, Iowa, a corporation of Iowa
Filed Oct. 31, 1966, Ser. No. 590,665
Int. Cl. G01r 27/02
U.S. Cl. 324—62                                                       6 Claims

ABSTRACT OF THE DISCLOSURE

A probe assembly for testing microminiaturized circuitry and elements including means for maintaining the probe contacts in a particular physical configuration. Biasing weights or springs maintain an individual bias on each probe contact.

---

This invention relates generally to test probes and particularly to a four-point probe useful in measuring electrical parameters of plane surfaces.

Electronic equipment used in many present day projects contains circuitry and elements falling into a classification commonly known as microminiaturization. Such circuits ordinarily contain a uniform coating of conductive material. In many applications it is necessary to know the resistivity of such conductive coatings. Such circuits also contain semi-conductive materials the resistivity of which is of importance. Because the circuits are very small dimensionally it is extremely difficult to accurately measure the resistivity or other parameters of interest. One of the difficulties stems from the inability to accurately manufacture test equipment and probes which are used in contacting the surface under consideration. Any probe or test equipment used must be very small and quite accurate. As is well-known, it is very difficult to manufacture accurate equipment on a small scale. An example of a testing circuit with which the probe herein described can be used is disclosed in application Serial No. 590,664 filed Oct. 31, 1966, of even date herewith by Harry D. Bush and John R. Fassett and assigned to the same assignee. The accuracy of the results of the equipmest used in the copending application are somewhat dependent upon a probe having contact points which form a square within close tolerances and which cas return to the same mechanical configuration many times. The points of the probe herein described are held to within 6% mean variation from that of a perfect square array and the deviation from the mean configuration is within ±1% for a point spacing of 20 mils. The configuration of the points permits a point spacing of 20 mils with a 1% configuration repeatability. The probe hereinafter fully described is therefore acceptable for testing procedures requiring a high degree of accuracy and repeatability.

It is therefore an object of this invention to describe a probe which is easily and accurately manufactured while at the same time is capable of measuring parameters on small surfaces or in small areas.

It is another object of this invention to provide a four-point probe which assures uniform but close spacing of said points.

It is another object of this invention to provide such a probe which permits easy alignment of the points of the probe with a plane surface.

It is another object of this invention to provide a four-point probe in which the points are maintained in a square configuration.

It is another object of this invention to provide such a probe in which the points are capable of individual and joint movement to insure uniform point contact with a plane surface.

It is another object of this invention to provide such a probe in which the individual points are individually biased to thereby insure point alignment with a plane surface.

It is another object of this invention to provide a probe in which torques tending to rotate the points radially are eliminated.

Further objects, features, and advantages of the invention will become apparent from the following description and claims when read in view of the accompanying drawings wherein like numbers indicate like parts and in which:

FIGURE 3 shows a first configuration of the spacers used to separate the points of the probe which is useful with the embodiments shown in both FIGURES 1 and 2;

FIGURE 4 shows a second configuration of the spacers used to separate the points which is likewise useful in the embodiments of both FIGURES 1 and 2.

Figure 1:
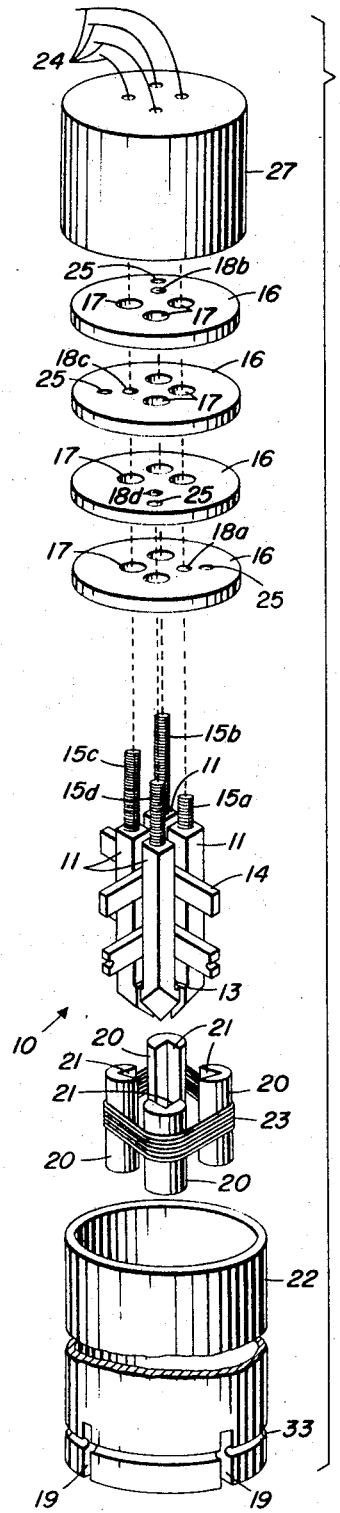
FIGURE 1 shows a first embodiment in which the points are weight-biased.
Figure 2:
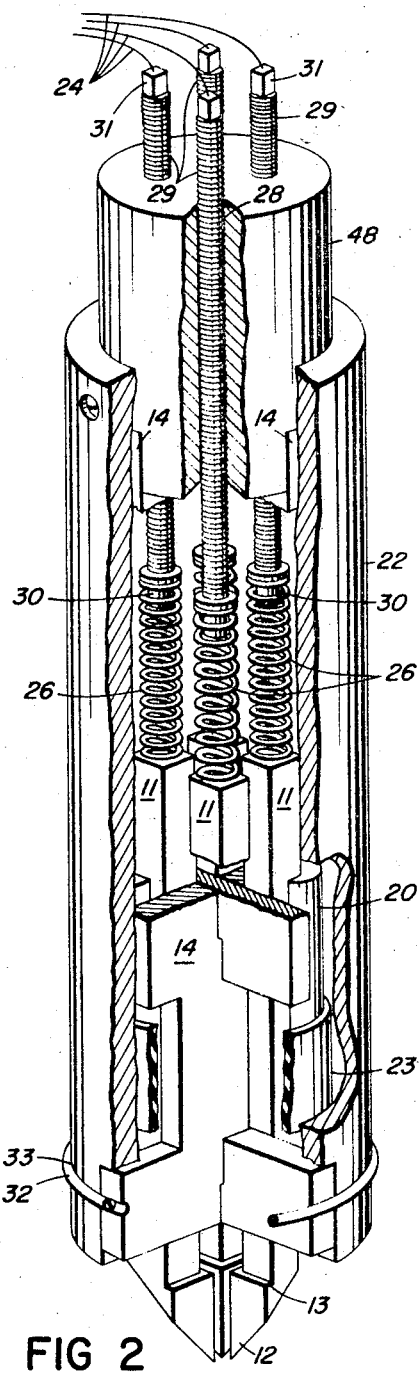
FIGURE 2 shows a second embodiment in which the points are spring-biased.

FIGURE 1 shows an embodiment in which the contact points of the probe are weight-biased. The four identical contacts 11 are arranged in a square such that they are spaced at 90° intervals. Each of the contacts 11 is designed to have a square cross section the bottom portion of which is cut at an angle to form a point 12. This permits the contacts to be easily repointed without affecting their alignment. As is best seen in FIGURE 2, each contact is formed with an offset portion 13 such that the point end of the contact is larger than the shank portion of the contact. The offset portion allows the contacts to be accurately machined such that the four contacts when arranged in the square configuration can be very close together while maintaining accurate spacing between the points. The four contacts 11 are separated by a spacer unit 14 which will be described in more detail hereinafter in reference to FIGURES 3 and 4.

Also, as shown in FIGURE 1, each contact 11 is provided with an extension in the form of a threaded portion 15a through 15d. The threaded portions can be integrally formed portions of contacts 11 or can be separate pieces rigidly attached to the individual contacts. The extensions or threaded portions 15b through 15d are of increasingly greater length than 15a. A series of biasing weights 16 each containing three clearance holes 17 and a threaded machine hole 18 are used to bias the four contacts. The holes 17 and 18 are placed such that the centers of the four holes lie at the corners of a square. The threaded portion 15 of each contact is screwed into the threaded hole of one of the weights. Threaded portion 15a will be turned into threaded hole 18a of the first weight while threaded portion 15b will be threaded into machine hole 18b of the second weight, etc. By designing the contacts 11 and weights 16 in this manner the four weights are identical and therefore only one type of weight need be manufactured. Each contact 11 is threaded into only one weight 16 in order to ease assembly of the unit.

A set of four contact aligning dowels 20, each containing a right angle cut 21, is used to insure that the longitudinal axes of contacts 11 are parallel to the longitudinal axis of cylinder 22 and to insure that the contacts 11 are retained in their proper position in the four quadrants of the spacer unit 14. A resilient ring 23 is used to hold the dowels 20 in position against contacts 11. The corner of each contact 11 is slidably engaged in a groove 21 of one of the dowels 20. The entire unit then fits into cylinder 22 and an open bottom can 27 covers the top of the probe. A set of leads 24 is attached to contacts 11 and to the test equipment with which the probe is used. Weights 16 also contain several holes 25 which are of a size and location to insure that the center of gravity of each weight lies at the geometrical center of the weight and therefore no turning torque is applied to the probes 11 by the weights 16. Turning torques which may exist are rendered ineffective by dowels 20 which uniformly hold contacts 11 against spacer 14. After assembly the assembled probe is retained is cylinder 22 by a snap ring or a resilient O-ring. The spacers 14 fit into slots 19 cut into cylinder 22 and the entire assembly consisting of the contacts 11, spacer 14, and dowels 20 is restrained and prevented from sliding and rotating inside the casing. However, the individual contacts 11 are free to individually slide in the spacer unit 14. This insures the uniform placement of the four contacts 11 against the plane surface the resistivity of which is intended to be measured. The square configuration of the contact array is assured by accurately squaring the individual contacts. The inward pressure of the slidable dowels 20 then compels a square relationship of the spacer members 14. Dowels 20 retain the contacts in the square configuration and parallel to the inside wall of cylinder 22 and thereby insures the repeatability of the square configuration.

The assembled unit can be placed into a holding fixture which holds the probe assembly in a vertical position. By slidably positioning the probe in the holding fixture the four contacts 11 can be brought against the surface of the sample being tested. Because each of contacts 11 is individually slidable within the probe, irregularities in the sample surface do not affect the physical contact between the sample and contacts 11.

FIGURE 2 shows an embodiment in which the contacts 11 and spacers 14 are identical to those of the embodiment shown in FIGURE 1. However, the weights 16 are replaced by a series of compression springs 26 and a plug 48 which is inserted into the upper end of cylinder 22. Plug 48 contains a series of holes 28 spaced at 90° intervals and tapped to receive a series of threaded screws 29. Each of screws 29 has an end 30 which fits into springs 26 to retain contact between the screws 29 and springs 26. The other end of screws 29 are machined such that a wrench can be applied to turn the screws and thereby individually bias each of contacts 11 by changing the compression on compression springs 26. A snap ring 32 is placed around cylinder 22 in a machine groove 33 to retain the contact assembly within cylinder 22. In this embodiment the compression springs 26 are uniformly applied to the top end of contacts 11 and therefore the biasing forces of the compression springs 26 are parallel to the longitudinal axis of the contacts and thereby eliminate the turning torques. Also guides 20 prevent rotation of contacts 11 and thereby all turning torques are eliminated from contacts 11 which insures uniform contact spacing.

FIGURE 3 shows the individual elements of the separator 14. This embodiment is shown in FIGURES 1 and 2 in the assembled probe. A main portion 34 is manufactured to have two axes symmetry. Each end contains a slot 35 in the center thereof and two grooves 36 in each side thereof. Grooves 36 are used to receive snap ring 32 and thereby hold the spacers within cylinder 22. Each spacer unit 14 also contains two end pieces 37 each containing a centered slot 38 and two side grooves 36. Grooves 36 are also used to retain separator 14 within cylinder 22. Slot 38 is dimensioned such that it meshes with slot 35 of element 34 so that the identical elements 37 are positioned at right angles with respect to element 34. The slots 35 and 38 are sufficiently large to enable the separator pieces to fit together loosely. In this manner the perpendicular relationship of the spacer elements is dependent upon the square configuration of contacts 11. Contacts 11 are positioned in the four quadrants formed by the substantially perpendicular relationship of elements 34 and 37. Because of the two axes symmetry of element 34 and the identical nature of end pieces 37 only two different pieces are required for the separator unit of this embodiment.

FIGURE 4 shows a second embodiment of the spacer unit 14. In this embodiment a main portion 39 contains a groove 41 and a slot 40 centered at one end thereof. The other end contains a second slot 42 in the center thereof. A second element 43 contains a slot 44 which is dimensioned to engage with slot 40 and thereby hold elements 39 and 43 at right angles with respect to one another. Element 43 also contains a groove 45 which is identical to groove 41 of element 39 and is positioned such that grooves 41 and 45 lie within the same plane when elements 39 and 43 are in their assembled relationship. These grooves are used to receive a resilient ring, or rubber band, which holds the assembled pieces 39 and 43 together. A third element 46 containing a slot 47, which is received by slot 42 of element 39, is applied to the other end of element 39. Slots 42 and 47 are positioned and dimensioned such that the two elements 39 and 46 are perpendicular and the top ends of the two elements lie within the same plane when the elements are assembled. It should be noted that slots 40, 44, and 47 do not fit tightly together and therefore the perpendicular relationship of elements 39, 43, and 46 is assured by the square configuration of contacts 11. A guide 48, which is also shown in the FIGURE 2 embodiment and replaces weights 16 of the FIGURE 1 embodiment, contains two slots 49. These slots are at right angles and extend only part way through guide 48. Slots 49 loosely receive the upper end of elements 39 and 46 such that the perpendicular relationship of elements 39 and 46 by the squared surfaces of contacts 11 is readily accomplished. Guide 48 contains four threaded holes 50 which receive screws 29 of the FIGURE 2 embodiment. Holes 50 and slots 49 thereof assist in maintaining contacts 11 in their desired relationship.

Although this invention has been described with respect to particular embodiments thereof, it is not to be so limited, as changes and modifications may be made therein which are within the spirit and scope of the invention.

We claim:
1. A probe for microminiaturized circuitry comprising: a plurality of elongated contacts, one end of each of said contacts being formed in a point, said contacts being arranged in a particular physical configuration, spacer means for separating said contacts by a predetermined distance and for maintaining said particular physical configuration, holding means for slideably receiving said contacts and for receiving said spacer means, said holding means maintaining said contacts and said spacer means as an assembled point array, a container for receiving said point array, retainer means for retaining said point array in said container, biasing means including a plurality of weights equal in number to said plurality of contacts for individually adjusting the longitudinal position of said elongated contacts in said point array, each of said contacts having a machined portion, the machined portion of each contact being longer than that of the preceding contact, and each of said weights containing one machined hole for receiving the machined portion of one of said contacts and a number of clearance holes for receiving the machined portion of said other contacts.

2. The probe of claim 1 wherein said spacer means comprises a first piece having slots in opposite ends thereof; and two end pieces each having a slot for engagement with one of the slots of said first piece to thereby position said end pieces in a perpendicular relationship with said first piece.

3. The probe of claim 1 wherein each of said contacts has an off-set portion at the point end thereof, so that the distance between said points can be less than the thickness of said spacer means.

4. The probe of claim 3 wherein said particular configuration is a square having one of said elongated contacts at each corner thereof.

5. The probe of claim 1 wherein said particular configuration is a square having one of said elongated contacts at each corner thereof and said machined portion and said machined hole are threaded.

6. A probe for microminiaturized circuitry comprising a plurality of elongated contacts, one end of each of said contacts being formed in a point, said contacts being arranged in a particular physical configuration, spacer means for separating said contacts by a predetermined distance and for maintaining said particular physical configuration, holding means for slideably receiving said contacts and for receiving said spacer means, said holding means maintaining said contacts in said spacer means as an assembled point array, a container for receiving said point array, plug retainer means for retaining said point array in said container, a plurality of screws equal in number to said plurality of contacts threadably supported by said plug retainer means and extending through either side of said plug retainer means and outside of said container, a plurality of spring biasing means equal in number to said plurality of contacts, each of said spring biasing means engaging one of said screws and one of said elongated contacts, the end of each of said screws which extends outside of said container accommodating means for adjusting the bias on each of said contacts.

References Cited

UNITED STATES PATENTS

| | | |
|---|---|---|
| 1,068,119 | 7/1913 | Foote. |
| 2,398,171 | 4/1946 | Zimmermann. |
| 2,586,868 | 2/1952 | Scott _____ 324—64 |
| 3,001,173 | 9/1961 | Swengel _____ 339—255 X |
| 3,134,942 | 5/1964 | Rhodes _____ 324—62 |
| 3,264,556 | 8/1966 | Krantz _____ 324—62 |

OTHER REFERENCES

Rudenberg, H. Gunther, Resistivity Measuring Techniques in Semiconductors, in Semiconductor Products, 2(9): pp. 28–34, September 1959.

EDWARD E. KUBASIEWICZ, Primary Examiner

J. M. HANLEY, Assistant Examiner

U.S. Cl. X.R.

324—72.5, 149